(12) United States Patent
Fernandez et al.

(10) Patent No.: US 6,203,088 B1
(45) Date of Patent: Mar. 20, 2001

(54) SLIDING CONSOLE SYSTEM

(75) Inventors: Carlos C. Fernandez; Daniel J. Koester, both of Holland, MI (US)

(73) Assignee: Johnson Controls Technology Company', Plymouth, MI (US)

( * ) Notice: Subject to any disclaimer, the term of this patent is extended or adjusted under 35 U.S.C. 154(b) by 0 days.

(21) Appl. No.: 09/233,679

(22) Filed: Jan. 19, 1999

(51) Int. Cl.⁷ .................................................. B60N 3/12
(52) U.S. Cl. .................. 296/37.8; 296/37.14; 296/24.1; 296/37.7; 296/37.15; 297/411.21
(58) Field of Search ............................. 296/37.8, 37.14, 296/34.1, 37.7, 37.15; 297/411.21

(56) References Cited

U.S. PATENT DOCUMENTS

| | | |
|---|---|---|
| 3,356,409 | 12/1967 | Belsky et al. . |
| 4,146,159 | 3/1979 | Hemmen . |
| 4,453,759 * | 6/1984 | Kathirria ............................ 296/37.8 |
| 4,685,729 * | 8/1987 | Heesch et al. ..................... 296/37.15 |
| 4,733,901 * | 3/1988 | Okuyama ............................ 296/37.8 |
| 4,818,008 * | 4/1989 | Cressoni ............................ 296/37.15 |
| 4,826,058 * | 5/1989 | Nakayama ............................ 296/37 |
| 4,934,750 | 6/1990 | Eichler et al. . |
| 5,085,481 * | 2/1992 | Fluharty et al. ..................... 296/37.8 |
| 5,096,249 * | 3/1992 | Hines ................................. 296/37.15 |
| 5,112,094 * | 5/1992 | Kribs ................................. 296/37.8 |
| 5,338,081 * | 8/1994 | Young et al. ........................ 296/37.8 |
| 5,387,064 * | 2/1995 | Cardinal ............................ 296/37.16 |
| 5,397,160 * | 3/1995 | Landry ................................. 296/37.8 |
| 5,542,589 * | 8/1996 | McKee ................................. 296/37.15 |
| 5,609,382 * | 3/1997 | Schmid et al. ........................ 296/37.8 |
| 5,823,599 * | 10/1998 | Gray ................................. 296/37.8 |
| 5,967,602 * | 10/1999 | Ptak et al. ........................ 296/37.15 |
| 6,003,927 * | 12/1999 | Korber et al. ........................ 296/37.8 |

FOREIGN PATENT DOCUMENTS

3807880 * 9/1989 (DE) .................................. 296/37.8

* cited by examiner

Primary Examiner—Joseph D. Pape
Assistant Examiner—Kiran Patel
(74) Attorney, Agent, or Firm—Foley & Lardner

(57) ABSTRACT

A sliding console system for a motor vehicle in which one or more console bodies are provided with a track for movement of the console body longitudinally within the motor vehicle. Multiple console bodies can be provided and each adjusted in position in the vehicle independent of one another. An elongated electrical cable or sliding contacts in the track can be utilized to provide electrical power to one or more electrical devices contained in the console bodies.

16 Claims, 3 Drawing Sheets

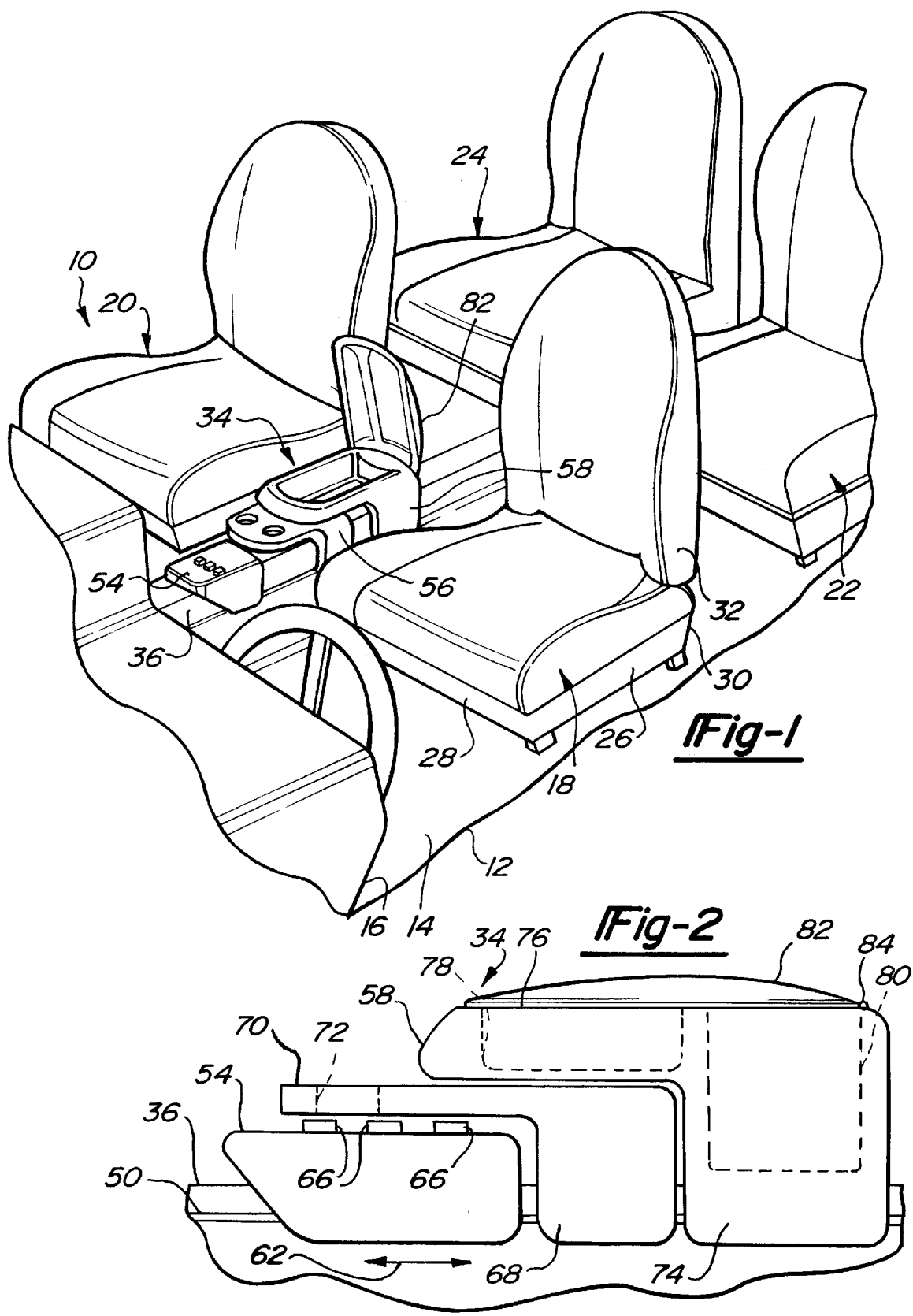

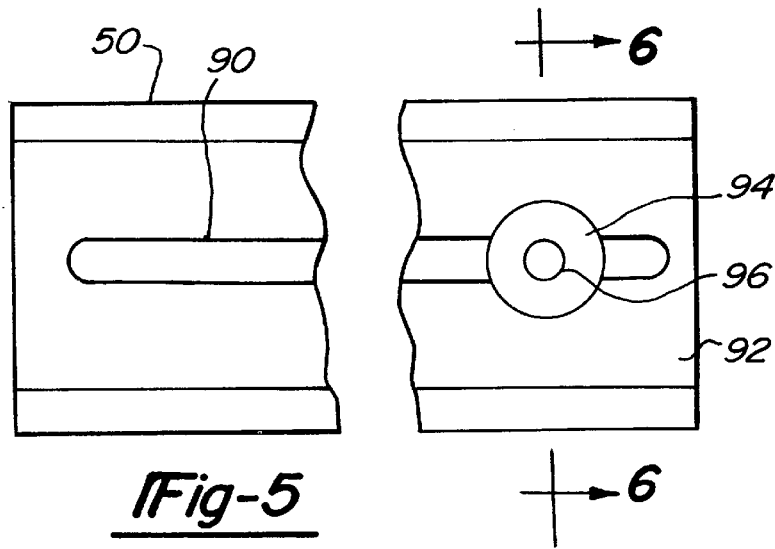
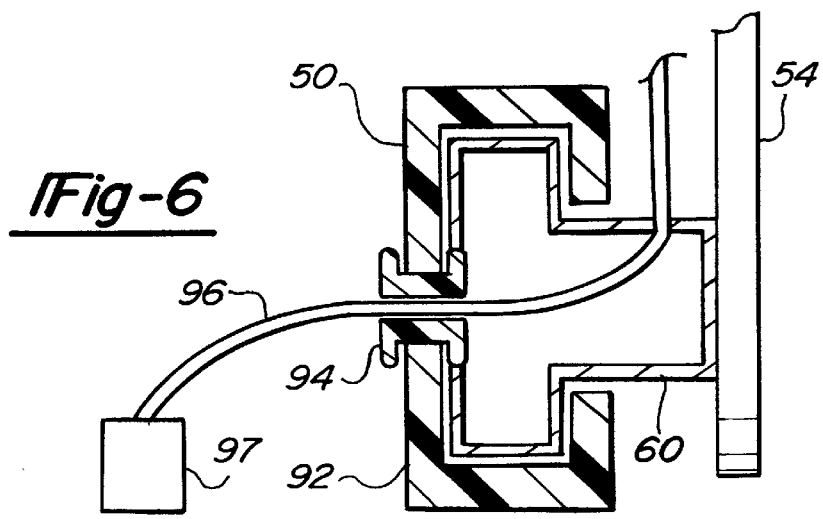
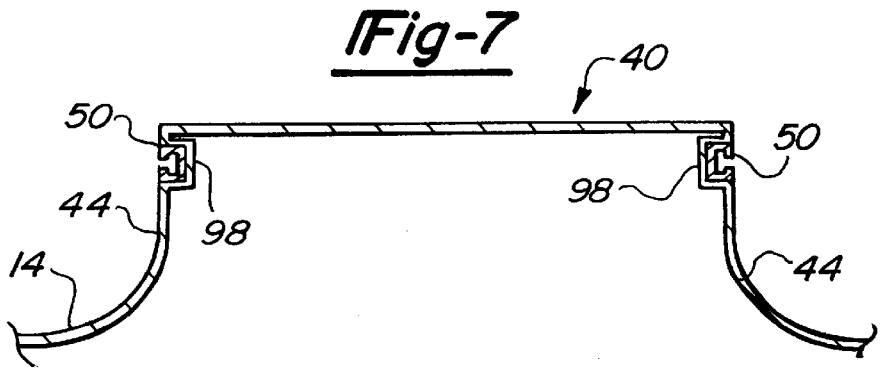

SLIDING CONSOLE SYSTEM

BACKGROUND OF THE INVENTION

The present invention relates to motor vehicle consoles and in particular to a sliding console system for a motor vehicle which can be moved longitudinally along a track structure in the vehicle. The console may include multiple console bodies which are movable along the track independently of one another.

Automobile manufacturers are seeking to provide vehicles which are versatile in how they can be used and which enable different occupants to use the same vehicle in different ways. One method of providing versatility in a vehicle is to provide adjustable interior components that can be positioned as desired by various users. For example, it is a common practice to provide seats which can be adjusted in a number of directions, including adjusting the position of the seat fore and aft within the vehicle, to accommodate different sized vehicle occupants.

SUMMARY OF THE INVENTION

The present invention seeks to provide versatility to a vehicle console by providing a console system in which a console body is movable fore and aft in the vehicle to different positions as desired by a vehicle occupant. In one embodiment, the console body is movable along a pair of tracks or rails mounted to the vehicle body in a generally stationary manner. Even greater flexibility is provided with multiple console bodies, or portions, which can each be independently moved within the vehicle. For example, a front console body may be provided which contains electrical controls and devices. An intermediate console body may be provided which contains cup holders. A third, or rear, console body may be provided which contains a storage compartment with a lid that serves as an armrest. Each of the console bodies can be moved along a common rail to various positions within the vehicle.

Electrical power can be provided to the sliding console bodies through electrical contacts in the rails. Alternatively, electrical connection can be made by a folding cable connected to the console body which contains the electrical devices. Various electrical devices can be contained in the console including controls for the radio, climate control system, seat adjuster, mirrors, vehicle lighting, rear window defroster, etc. In addition, the console may contain complete electrical devices such as a radio, telephone, a power port, etc., all of which require connection to an electric power source.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a vehicle interior containing the console system of the present invention;

FIG. 2 is a side view of the console system shown in FIG. 1;

FIG. 5 is a side view of an alternative embodiment of the generally stationary rail of the console system of the present invention;

FIG. 6 is a sectional view of the generally stationary rail as seen from substantially the line 6—6 of FIG. 5; and FIG. 7 is a sectional view of a vehicle body floor pan having the generally stationary rails of the console system attached directly thereto.

DETAILED DESCRIPTION OF THE PREFERRED EMBODIMENT

Figure 3:
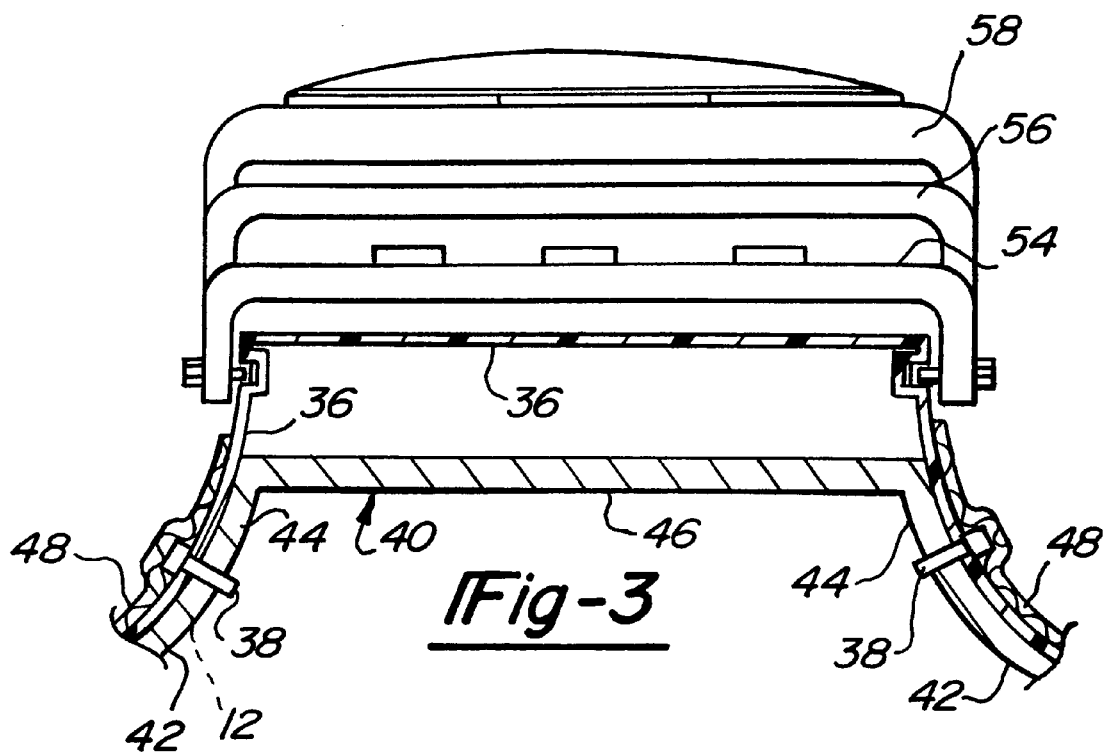
FIG. 3 is a front sectional view of the console system as seen from substantially the line 3—3 of FIG. 2.

The console system of the present invention is shown in FIG. 1 contained within a vehicle 10. Only the interior of vehicle 10 is shown. The vehicle 10 includes a body 12 having floor pan portion 14. The vehicle 10 includes an instrument panel 16 in a conventional manner for motor vehicles. Four bucket seats are shown in the vehicle, a front row driver side seat 18, a front row passenger side seat 20, a rear or second row driver side seat 22, and a rear or second row passenger side seat 24. Each of the seats 18, 20, 22, and 24 includes a generally horizontal seat bottom 26 having a front end 28 and a rear end 30. The seats 18, 20, 22, 24 further include seat backs 32 which extend upwardly at the rear ends 30 of the seat bottoms 26. While the rear row is comprised of two bucket seats 22 and 24, it will be readily appreciated that a single bench seat can be used to form the rear row of seats, if desired.

The sliding console system 34 of the present invention is shown in FIG. 1 between the driver side seats 18, 22 and passenger side seats 20, 24. The console system 34 includes a mounting member 36 (FIG. 3), which is attached to the floor pan portion 14 of the vehicle body 12 by fasteners 38. The vehicle body 12 floor pan portion 14 includes a fore and aft extending raised center portion 40 which projects upwardly above the adjacent portions 42 of the floor pan 14, in the area where the seats 18, 20, 22, 24 are located. The raised center portion 40 is constructed of a pair of spaced upwardly projecting sides 44 and a top wall 46 spanning between the two sides 44, forming a generally inverted U-shaped section. The sides 44 do not have to be vertical or planer nor does the top 46 need to be planer. The raised center portion 40 can have various sectional shapes as desired.

The mounting member 36 extends longitudinally through the vehicle interior over the entire extent of the adjustment range of the console system 34. The mounting member 36 provides a structure for mounting the movable console bodies as well as providing a decorative appearance to the center portion 40 of the vehicle floor pan 12 which need not be covered by a floor covering 48 (FIG. 3).

Attached to the mounting member 36 along each side are rails 50. The rails 50 extend generally along the entire length of the mounting member 36. As shown in FIG. 1, the rails 50 extend from the instrument panel rearward to approximately the rear end 30 of the seat bottoms 26 of the rear row of seats 20 and 24. As will be apparent, the rails 50 can be of any length and, in the case of a bench seat in the second or rear seat row, the rails would stop at the front end 28 of the seat bottom 26 of the rear row of seats. It will be appreciated that the vehicle can have more than two rows of seats with a single console system 34 extending through all or only some of the rows of seats. Additionally, the rails 50 may only extend to the rear end 30 of the front row seats if the console system 34 is only intended for use by the occupants of the front row seats.

Figure 4:
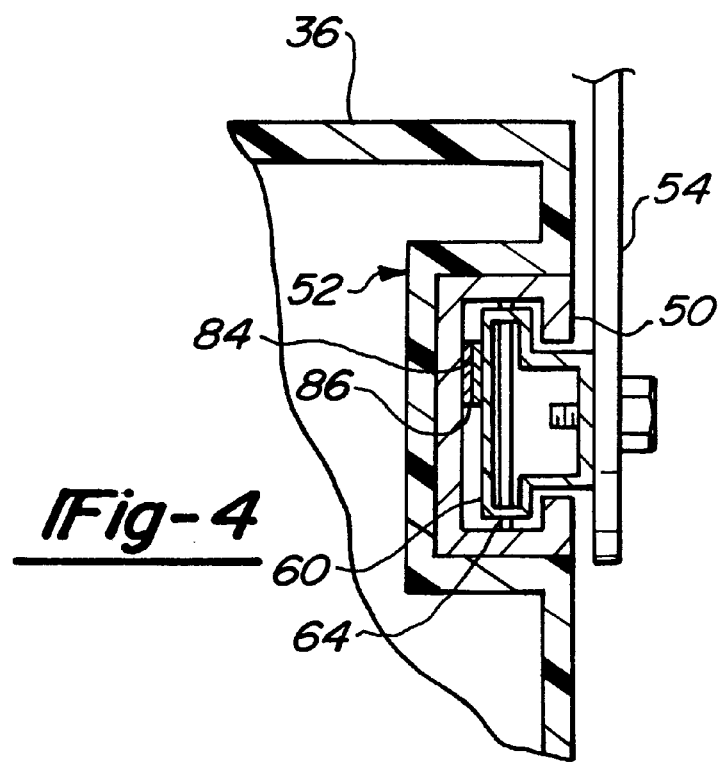
FIG. 4 is an enlarged sectional view of the track portion of the console system of the present invention.

With reference to FIG. 4, the rail 50 is shown as a C-shaped channel having an opening along one side. The rail 50 is disposed in a longitudinally extending recess 52 along the side 44 of the mounting member 36. It will be appreciated that a variety of different shapes can be employed for the rail 50. Likewise, the rail 50 need not be attached in a recess in the mounting member 36 but may extend outward from the surface of the mounting member 36, if desired. The console system 34 includes one or more console bodies 54, 56, 58 mounted to the rails 50 and movable fore and aft within the vehicle 10 along the length of the rails 50. For example, with reference to FIG. 2, three console bodies, a front console body 54, an intermediate console body 56 and a rear console body 58, are shown. Each of the console bodies are provided with a slide rail 60 coupled to each rail 50 to mount the console bodies 54, 56, 58 to the mounting member 36. The slide rails 60 also provide for fore and aft movement of the console bodies 54, 56, 58 along the length of the rails 50 as shown by the arrow 62 in FIG. 2. The slide rails 60 may include rollers 64 or other bearings to provide smooth movement of the slide rails 60 within the rails 50.

The three console bodies 54, 56, 58 can be equipped with various features as shown with reference to FIG. 2. For example, the console body 54 is shown with a plurality of electrical devices 66. The electrical devices 66 may be controls for various components of the motor vehicle such as the radio, climate control system, seat adjuster, mirrors, vehicle lights, rear window defroster, etc. In addition, instead of merely containing controls, actual vehicle devices such as a radio, telephone, electrical power port, etc. may be contained within the console body 54.

The console body 56 has a mounting portion 68 and a cupholder portion 70 which extends forward from the mounting portion 68. The cupholder portion 70 includes one or more cupholders 72, illustrated schematically. The cupholder portion 70 is vertically higher than the front console body 54 such that the cupholder portion 70 may be placed above the electrical devices 66 of the console body 54 as shown in FIG. 2.

The console body 58 likewise contains a mounting portion 74 and a forward portion 76. The forward portion 76 is disposed higher than the console body 56 and can be positioned vertically above the console body 56 if desired. The forward portion 76 includes a shallow storage compartment 78 while the mounting portion 74 includes a deeper storage compartment 80. A lid 82 is attached to the console body 58 by a hinge 84 enabling the lid 82 to be raised for access to the storage compartments 78 and 80. The lid 82 may serve as an armrest and thus may be provided with a padded upper surface.

FIG. 2 only illustrates an exemplary embodiment of the invention. The sliding console system 34 of the present invention is not limited to the particular structure shown. For instance, electrical devices are not limited to the front console body 54 only, nor are the cupholders limited to the intermediate console body 56 or the storage compartments limited to the rear console body 58. The console system may include any number of console bodies.

The console bodies 54, 56, 58 can be moved rearward such that the armrest provided by the console body 58 can be used by the rear row seat occupants.

In order to have electrical devices 66 in a sliding console body 54, it is necessary to provide electrical power to the console body 54. One means for doing so is shown in FIG. 4. There the rail 50 is provided with an electrical contact strip 84 which engages a sliding contact 86 carried by the slide rail 60. The contact strip 84 is coupled to the vehicle electrical system 97 by a wire, not shown. Likewise, sliding contact 86 is coupled through a wire to the electrical devices 66.

An alternative electrical connection is shown in FIGS. 5 and 6. In FIG. 5, the rail 50 is equipped with an elongated slot 90 in the back wall 92 of the C section rail. A bushing or grommet 94 is disposed within the slot 90 having a center passage through which wires 96 can pass. The wires 96 connect devices 66 to the electrical system 97 of the motor vehicle. A length of the wire 96 can be attached to the lower surface of the mounting member 36 to provide the necessary wire length to enable movement of the console body 54 containing the electrical devices 66 along the rail 50.

With reference to FIG. 7, an alternative embodiment of the invention is shown. The vehicle body floor pan 14 has a raised center portion 40 with upwardly extending sides 44. The sides 44 are each formed with longitudinal recesses 98 which receive the rails 50 therein. In this embodiment, a mounting member 36 is not utilized between the rails 50 and the vehicle body 14. As described above in connection with the mounting member 36, the rails 50 need not be placed in recesses 98 in the sides 44 but can project outward from the sides 44.

While the console system 34 has been shown in connection with two rails 50 coupled to the vehicle body 12 and two slide rails 60 on each of the console bodies 54, 56, 58, it will be appreciated that the console system 34 of the present invention can function with a single rail 50 along the longitudinal center line of the console bodies 54, 56, 58.

The console system 34 of the present invention provides a vehicle user with flexibility and versatility in the position of the various components and features in the console system. This is accomplished by enabling the console bodies 54, 56, 58 and the various features contained therein to be moved relative to the vehicle body 12 at the desire of the vehicle occupants.

It is to be understood that the invention is not limited to the exact construction illustrated and described above. But that various changes and modifications may be made without departing from the spirit and scope of the invention as defined in the following claims.

What is claimed is:

1. A console system for a vehicle having a vehicle body, the console system comprising:
   a generally stationary rail adapted to be mounted to the vehicle body;
   a first console body having a first slide rail coupled to said generally stationary rail for movement of said first console body relative to said generally stationary rail; and
   a second console body including a second slide rail coupled to said generally stationary rail for movement relative to said generally stationary rail whereby said first and second console bodies can be separately moved relative to said generally stationary rail and the vehicle body.

2. The console system of claim 1 comprising a pair of said generally stationary rails spaced apart from one another and said first and second bodies include a pair of said first and second slide rails respectively coupled to one each of said pair of generally stationary rails.

3. The console system of claim 1 further comprising a mounting member adapted for mounting to the vehicle to which said generally stationary rail is attached whereby said generally stationary rail is mounted to the vehicle body.

4. The console system of claim 1 wherein the vehicle has an electrical system and further comprising at least one electrical device carried by one of said first and second console bodies and an electrical connector for connecting said at least one electrical device to the electrical system of the vehicle.

5. The console system of claim 4 wherein said electrical connector is a cable and wherein said generally stationary rail has an elongated slot therein through which said cable extends whereby said cable moves along said slot when said one of said first and second console bodies having said electrical device is moved relative to said generally stationary rail.

6. The console system of claim 1 wherein the vehicle has an instrument panel, a front seat and a rear seat, each said seat having a generally horizontal seat bottom having front and rear ends and a seat back extending upwardly at the rear end of the seat bottom, and wherein said generally stationary rail extends from the instrument panel to the front end of the seat bottom of the rear seat.

7. The console system of claim 1 wherein the vehicle has an instrument panel, a front seat and a rear seat, each said seat having a generally horizontal seat bottom having front and rear ends and a seat back extending upwardly at the rear end of the seat bottom, and wherein said generally stationary rail extends from the instrument panel to the rear end of the seat bottom of the rear seat.

8. A console system for a vehicle having a vehicle body with a front seat and a rear seat, each seat having a seat bottom, each seat bottom having a rear end, the console system comprising:

first and second generally stationary rails spaced apart and parallel to one another and adapted to be mounted to the vehicle body;

a console body including first and second side rails coupled to said first and second generally stationary rails respectively for movement of said console body relative to said first and second generally stationary rails;

wherein said first and second generally stationary rails extend to a point between said rear end of said front seat and said rear end of said rear seat, such that at least a portion of said console body may be positioned between said front seat and said rear seat.

9. The console system of claim 8 further comprising a mounting member adapted for mounting to the vehicle to which said first and second generally stationary rails are attached whereby said first and second generally stationary rails are mounted to the vehicle body.

10. The console system of claim 8 wherein the vehicle has an electrical system and further comprising at least one electrical device carried by said console body and an electrical connector for connecting said at least one electrical device to the electrical system of the vehicle.

11. The console system of claim 8 wherein the vehicle has an instrument panel, wherein said first and second generally stationary rails extend from said instrument panel to said rear end of said bottom of said rear seat.

12. A console system for a vehicle having a vehicle body and an electrical system, the console system comprising:

a generally stationary rail adapted to be mounted to the vehicle body;

a console body including a slide rail coupled to said generally stationary rail for movement of said body relative to said generally stationary rail;

at least one electrical device carried by said console body; and an electrical connector for connecting said at least one electrical device to the electrical system of the vehicle.

13. The console system of claim 12 wherein said electrical connector is a cable and wherein said generally stationary rail has an elongated slot therein through which said cable extends whereby said cable moves along said slot when said console body is moved relative to said generally stationary rail.

14. The console system of claim 12 wherein said electrical connector includes electrical contacts in said generally stationary and slide rails in contact with one another along the length of said generally stationary rail.

15. The console system of claim 12 further comprising a console mounting member adapted to be attached directly to the body of the vehicle and wherein said generally stationary rail is mounted to said console mounting member whereby said generally stationary rail is coupled to said vehicle body.

16. A console system for a vehicle having a vehicle body with a front seat and a rear seat, each seat having a seat bottom, each seat bottom having a rear end, the console system comprising:

first and second generally stationary rails spaced apart and parallel to one another and adapted to be mounted to the vehicle body;

a console body including first and second side rails coupled to said first and second generally stationary rails respectively for movement of said console body relative to said first and second generally stationary rails;

wherein said first and second generally stationary rails extend to a point between said rear end of said front seat and said rear end of said rear seat, such that at least a portion of said console body may be positioned between said front seat and said rear seat, said rear seat bottom having a front end, wherein said first and second generally stationary rails extend from said instrument panel to said front end of said seat bottom of said rear seat.

* * * * *